UNITED STATES PATENT OFFICE 1,921,362

WATER INSOLUBLE AZODYESTUFF

Leopold Laska, Arthur Zitscher, and Wilhelm Koch, Offenbach-on-the-Main, Germany, assignors to General Aniline Works, Inc., New York, N. Y., a Corporation of Delaware No Drawing. Application August 22, 1929, Serial No. 387,801, and in Germany September 11, 1928

10 Claims.  (Cl. 260—95)

Our present invention relates to new water-insoluble azodyestuffs of the probable general formula:

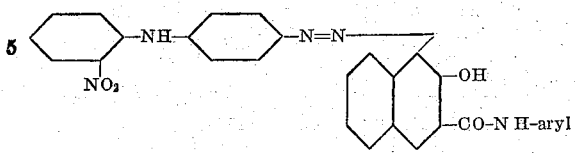

in which formula the benzene nuclei may contain further monovalent substituents, such as a further nitro group, halogen, methyl or alkoxy. They are obtained by combining a diazotized compound of the diphenylamine series of the general formula:

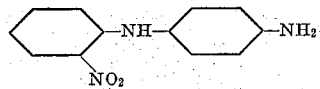

wherein the benzene nuclei may contain further monovalent substituents, such as a further nitro group, halogen, methyl or alkoxy, with any arylamide of 2.3-hydroxynaphthoic acid not containing groups, such as the sulfonic or carboxylic acid groups, which would render the dyestuffs soluble.

The new azodyestuffs yield valuable color lakes, when mixed with the usual substrata, and particularly valuable dyeings, when produced on the vegetable fiber according to the ice-color methods. They are distinguished by a high tinctorial power and by the dark garnet to garnet-brown shades of the lakes and dyeings obtained therewith. These shades are of great practical importance especially for the production of the so-called "Turkey-chocolates" of the oriental countries. It is surprising that some of the dyeings produced by the present method are remarkably fast to kier boiling.

Example 1

Well boiled and dried cotton yarn is impregnated with a solution containing per liter 4 grs. of 2.3-hydroxynaphthoyl-4-chloroaniline, 10 ccm. of Turkey red oil, and 8 ccm. of a caustic soda solution of 34° Bé., well wrung out and developed in a diazo solution, which is neutralized with sodium bicarbonate, containing 2.7 grs. of 4-amino-3'-chloro-6'-nitro-diphenylamine, rinsed and soaped.

In this manner a very dark garnet-brown dyeing of very satisfactory fastness to kier boiling is obtained.

The dyestuff thus produced on the fiber corresponds probably to the formula:

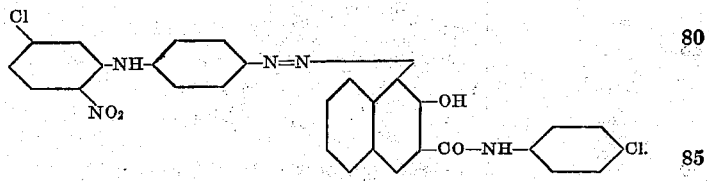

Example 2

Cotton yarn previously treated in the usual manner is impregnated with a solution containing per liter 2.5 grs. of 2.3-hydroxynaphthoyl-2-naphthylamine, 10 ccm. of Turkey red oil, and 7.5 ccm. of a caustic soda solution of 34° Bé., well wrung out and developed in a diazo solution, which is neutralized with sodium bicarbonate, containing 2.8 grs. of 4-amino-2'.4'-dinitro-diphenylamine per liter and worked up as usual.

In this manner a dark garnet dyeing of very good fastness is obtained.

The dyestuff thus produced on the fiber corresponds probably to the formula:

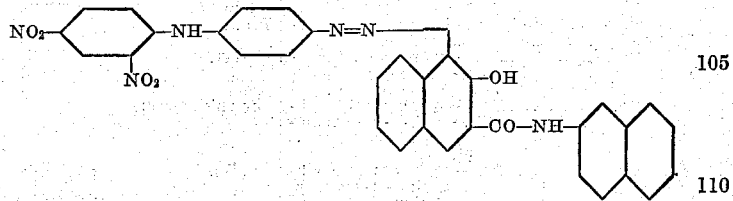

*Example 3*

Cotton yarn is, after the customary preliminary treatment, impregnated with a solution containing per liter 5 grs. of 2.3-hydroxynaphthoyl-4-anisidine, 10 ccm. of Turkey red oil, and 15 ccm. of a caustic soda solution of 34° Bé., well wrung out and then developed in a neutralized diazo solution containing 3.5 grs. of 4-amino-2.5-dichloro-2'.4'-dinitrodiphenylamine per liter and worked up in the customary manner.

A garnet-brown dyeing of good fastness to light is obtained.

The dyestuff thus produced on the fiber corresponds probably to the formula:

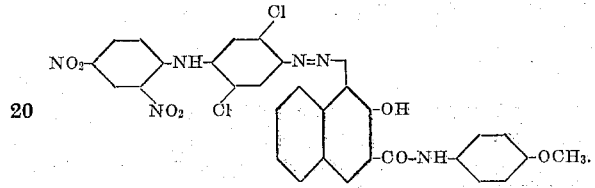

The process may be carried out in the same manner with other compounds of the diphenylamine series substituted as in the above general formula with a nitro-group in the o-position to the imino-group and with other arylides of 2.3-hydroxynaphthoic acid.

In the following table there are cited some further components suitable for the combination according to our process and the shades of dyeings obtained by the production of the dyestuffs on the fiber:

| Diazo-compound of | Combined with | Shade of dyeing obtained |
|---|---|---|
| 4 - amino - 2' - nitro-diphenylamine. | 2.3 - hydroxynaphthoyl-aniline. | Blackish garnet-brown. |
| Do. | 2.3 - hydroxynaphthoyl-o-anisidine. | Do. |
| Do. | 2.3 - hydroxynaphthoyl-2 - amino - 5 - chloro - 1 - methyl-benzene. | Dark brown garnet. |
| Do. | 2.3 - hydroxynaphthoyl-2-amino-5-chloro-hydroquinonedimethylether. | Brown garnet. |
| Do. | 2.3 - hydroxynaphthoyl-1-naphthylamine. | Dark brown garnet. |
| 4 - amino - 3' - chloro-6' - nitro - diphenylamine. | 2.3 - hydroxynaphthoyl-p-phenetidine. | Garnet-brown. |
| Do. | 2.3 - hydroxynaphthoyl-p-chloro-aniline. | Dark garnet-brown. |
| Do. | 2.3 - hydroxynaphthoyl-2-aminohydroquinone-dimethylether. | Brown garnet. |
| Do. | 2.3 - hydroxynaphthoyl-5 - amino - 2 - methoxy-1-methylbenzene. | Dark garnet-brown. |
| Do. | 2.3 - hydroxynaphthoyl-1-naphthylamine. | Do. |
| Do. | 2.3 - hydroxynaphthoyl-2-naphthylamine. | Do. |
| Do. | 2.3 - hydroxynaphthoyl-2 - amino - 3 - naphthol-methylether. | Garnet-brown. |
| 4-amino-2.5-dimethyl-3'-chloro-6'-nitro-diphenylamine. | 2.3 - hydroxynaphthoyl-o-toluidine. | Brownish garnet. |
| Do. | 2.3 - hydroxynaphthoyl-2-amino-4-chloro-1-methoxybenzene. | Do. |
| Do. | 2.3 - hydroxynaphthoyl-2 - amino - 5 - chloro-hydroquinonedimethylether. | Garnet-brown. |
| Do. | 2.3 - hydroxynaphthoyl-1-naphthylamine. | Dark garnet-brown. |
| 4 - amino - 2'.4' - dinitro-diphenylamine. | 2.3 - hydroxynaphthoyl-p-anisidine. | Brownish garnet. |
| Do. | 2.3 - hydroxynaphthoyl-2 - amino - hydroquinonedimethylether. | Garnet. |
| Do. | 2.3 - hydroxynaphthoyl-2 - amino - 5 - chloro-hydroquinonedimethylether. | Brownish garnet. |
| Do. | 2.3 - hydroxynaphthoyl-5 - amino - 2 - methoxy 1- methylbenzene | Do. |
| 4-amino-2'.4'-dinitro-diphenylamine. | 2.3 - hydroxynaphthoyl-1-naphthylamine. | Red-brown. |
| 4 - amino - 3 - methyl-2'.4'-dinitro-diphenylamine. | 2.3 - hydroxynaphthoyl-6 - amino - 3 - methoxy-1-methylbenzene. | Bluish garnet. |
| Do. | 2.3 - hydroxynaphthoyl-1-naphthylamine. | Do. |
| Do. | 2.3 - hydroxynaphthoyl-2-naphthylamine. | Do. |
| 4-amino-3-methoxy-2'.4' dinitrodiphenylamine. | 2.3 - hydroxynaphthoyl-p-anisidine. | Dark bluish garnet. |
| Do. | 2.3 - hydroxynaphthoyl-m-nitroaniline. | Irongarnet. |
| Do. | 2.3 - hydroxynaphthoyl-2 - amino - 5 - chloro-hydroquinonedimethylether. | Violetish brown. |
| 4 - amino - 3 - chloro-2'.4' - dinitro - diphenylamine. | 2.3 - hydroxynaphthoyl-aniline. | Garnet. |
| Do. | 2.3 - hydroxynaphthoyl-o-toluidine. | Brownish claret. |
| Do. | 2.3 - hydroxynaphthoyl-6 - amino - 3 - methoxy-1-methylbenzene. | Garnet. |
| Do. | 2.3 - hydroxynaphthoyl-1-naphthylamine. | Bluish garnet. |
| Do. (2 mol. proportions.) | bis - 2.3-hydroxynaphthoyl-dianisidine. | Reddish brown. |
| 4-amino-2.5- dichloro-2'.4'-dinitro - diphenylamine. | 2.3 - hydroxynaphthoyl-aniline. | Full red-brown. |
| Do. | 2.3 - hydroxynaphthoyl-p-phenetidine. | Red-brown. |
| Do. | 2.3 - hydroxynaphthoyl-2 - aminohydroquinone-dimethylether. | Do. |
| Do. | 2.3 - hydroxynaphthoyl-5 - amino - 2 - methoxy-1-methylbenzene. | Do. |
| Do. | 2.3 - hydroxynaphthoyl-m-nitroaniline. | Do. |
| Do. | 2.3 - hydroxynaphthoyl-2-naphthylamine. | Brownish garnet. |
| 4 - amino - 3 - nitro-2'.4'-dinitro-diphenylamine. | 2.3 - hydroxynaphthoyl-o-anisidine. | Garnet. |
| Do. | 2.3 - hydroxynaphthoyl-2 - aminohydroquinone-dimethylether. | Bluish garnet. |
| Do. | 2.3 - hydroxynaphthoyl-2 - amino - 5 - chloro-hydroquinonedimethylether. | Brownish garnet. |
| Do. | 2.3 - hydroxynaphthoyl-6 - amino - 3 - methoxy-1-methylbenzene. | Garnet. |
| Do. | 2.3 - hydroxynaphthoyl-2 - amino - 5 - chloro - 1 - methoxybenzene. | Do. |

We claim:

1. As new compounds azodyestuffs corresponding probably to the general formula:

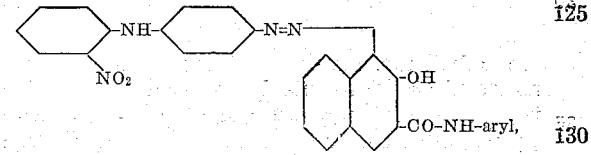

in which formula the benzene nuclei may contain alkyl, alkoxy, nitro or halogen, which dyestuffs yield color lakes, when mixed with the usual substrata, and dyeings, when produced on the vegetable fiber according to the ice-color methods, the color lakes and dyeings being distinguished by dark garnet to garnet-brown shades.

2. As new compounds azodyestuffs corresponding probably to the general formula:

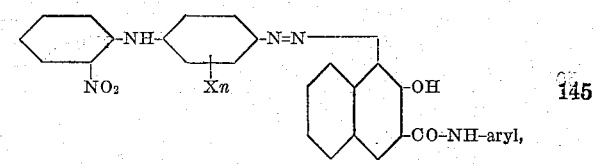

in which formula X stands for halogen, $n$ for the number one or two and the nucleus bearing the nitro group may contain a chlorine atom or a further nitro group, which dyestuffs yield color lakes when mixed with the usual substrata and dyeings when produced on the vegetable fiber according to the ice-color methods, the color lakes and dyeings being distinguished by dark garnet to garnet-brown shades.

3. As new compounds azodyestuffs corresponding probably to the general formula:

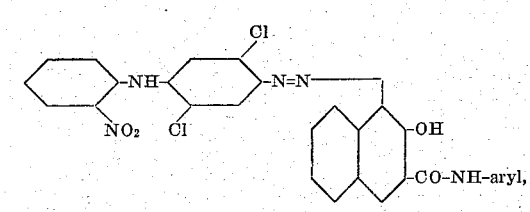

in which formula the benzene nucleus bearing the nitro group may contain a chlorine atom or a further nitro group, which dyestuffs yield color lakes when mixed with the usual substrata and dyeings when produced on the vegetable fiber according to the ice-color methods, the color lakes and dyeings being distinguished by dark garnet to garnet-brown shades.

4. As new compounds azodyestuffs corresponding probably to the general formula:

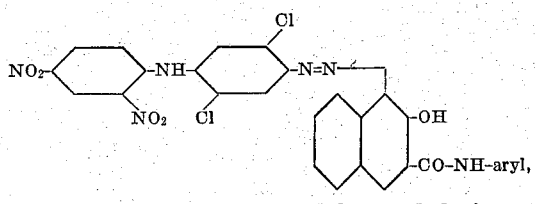

which dyestuffs yield color lakes and dyeings of dark garnet to garnet-brown shades.

5. As a new compound the azodyestuff corresponding probably to the formula:

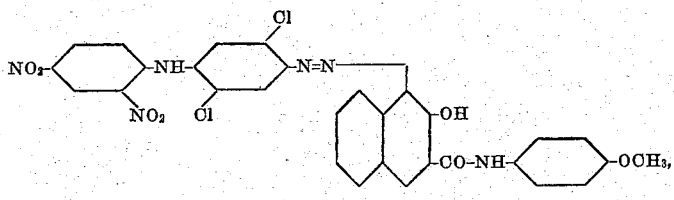

which dyestuff yields color lakes and dyeings of garnet-brown shade and good fastness to light.

6. As new compounds, azodyestuffs corresponding probably to the general formula:

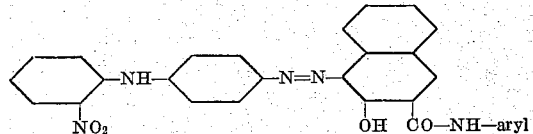

in which formula the nucleus bearing the nitro group may contain a chlorine atom or a further nitro group, said dyestuffs yielding color lakes, when mixed with the usual substrata, and dyeings, when produced on vegetable fiber according to ice-color methods, the color lakes and dyeings being distinguished by dark garnet to garnet-brown shades.

7. As a new compound, the azodyestuff corresponding probably to the formula:

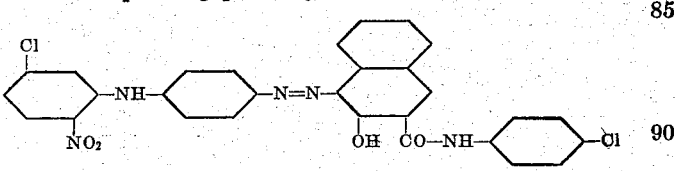

which dyestuff yields color lakes and dyeings of a very dark garnet-brown shade and satisfactory fastness to kier boiling.

8. The method of making an azo dye which comprises coupling diazotized 4-amino-2'.4'-dinitro-diphenylamine with an arylide of 2.3-hydroxynaphthoic acid.

9. As a new product, an azo dye having the general formula:

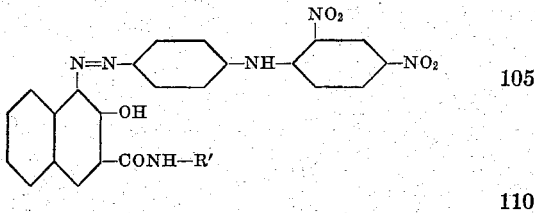

wherein R' represents a residue of the benzene or naphthalene series.

10. As new compounds azo dyestuffs corresponding to the general formula:

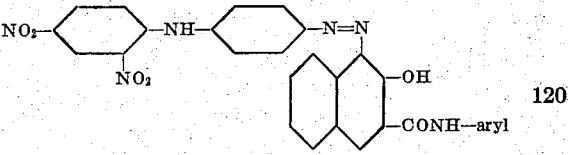

in which formula the benzene nuclei may be further substituted by alkyl, nitro or halogen groups.

LEOPOLD LASKA.
ARTHUR ZITSCHER.
WILHELM KOCH.